US005136880A

United States Patent [19]

Norgauer

[11] Patent Number: 5,136,880

[45] Date of Patent: Aug. 11, 1992

[54] ARRANGEMENT FOR DETECTING A CHANGING OPERATING PARAMETER

[75] Inventor: Rainer Norgauer, Stuttgart, Fed. Rep. of Germany

[73] Assignee: Robert Bosch GmbH, Stuttgart, Fed. Rep. of Germany

[21] Appl. No.: 699,331

[22] Filed: May 13, 1991

[30] Foreign Application Priority Data

May 14, 1990 [DE] Fed. Rep. of Germany ....... 4015415

[51] Int. Cl.[5] ............ G01M 19/00

[52] U.S. Cl. ............ 73/117.3

[58] Field of Search ............ 73/117.3, 118.1; 324/601; 123/479

[56] References Cited

U.S. PATENT DOCUMENTS 3,416,084 12/1968 Julie ............ 324/601 X 4,718,272 1/1988 Plapp ............ 73/118.1

*Primary Examiner*—Jerry W. Myracle

*Attorney, Agent, or Firm*—Walter Ottesen

[57] ABSTRACT

The invention is directed to an arrangement for detecting a changing operating parameter of an internal combustion engine and/or of a motor vehicle especially for measuring angle. The arrangement has at least two measuring devices detecting the particular operating parameter and these measuring devices have pregiven characteristics for generating signal values representing the operating parameter. The characteristics have respectively different forms and are linear over the value range of the operating parameter and the characteristic of at least one of the measuring devices has a slope which deviates from that of the other measuring device. Irregularities in the area of the common voltage supply of the measuring devices can be detected by correlating the signal values generated by the measuring devices having characteristics deviating from each other.

12 Claims, 3 Drawing Sheets

ARRANGEMENT FOR DETECTING A CHANGING OPERATING PARAMETER

FIELD OF THE INVENTION

The invention relates to an arrangement for detecting a changing operating parameter of an internal combustion engine and/or of a motor vehicle.

BACKGROUND OF THE INVENTION

An arrangement for detecting a changing operating parameter of the kind referred to above can be utilized especially for angle measurement in an internal combustion engine and is disclosed in European patent publication no. 0,118,247. The two measuring devices generate respective signal values which represent the operating parameter to be detected. A linear characteristic is pregiven for one of the measuring devices and is dependent on the parameter to be detected; whereas, another measuring device has this linear characteristic only in selected signal value ranges and does not generate signal values outside of this range. These signal value ranges are pregiven with reference to a function monitoring of the measuring devices and/or of the system by means of plausibility comparisons of the signal values of the measuring devices.

Since the measuring devices have a common voltage supply, irregularities and especially value fluctuations in the supply voltage lead to incorrect measuring results and therefore to malfunctions of the internal combustion engine and/or of the system connected to the measuring devices which cannot be detected by the plausibility monitoring referred to above.

SUMMARY OF THE INVENTION

In view of the above, it is an object of the invention to provide measures which improve the operational reliability of an arrangement for detecting a changing operating parameter of an internal combustion engine and/or of a motor vehicle. The arrangement according to the invention provides that the characteristics of at the at least two measuring devices for detecting the operating parameter are linear over the value range of the operating parameter at least outside of the extreme value ranges. The slope of at least one of the characteristics deviates from the slope of the other or all of the others in the case where there are more than two measuring devices. This makes it possible to detect irregularities in the area of the voltage supply of the measuring devices.

U.S. Pat. No. 4,603,675 describes the application of such an arrangement for detecting position in an electronic engine power control. With such systems which are relevant to safety, the above-described disadvantages caused by irregularities in the voltage supply of the position detecting elements are especially disadvantageous since the power of the engine is influenced in dependence upon the signal values of the position detecting elements.

The arrangement according to the invention improves the operational reliability thereof for detecting an operating parameter and of the control system equipped with this arrangement in the area of internal combustion engines and/or of a motor vehicle. A special advantage is realized in arrangements having a common voltage supply with these arrangements comprising several measuring devices for detecting the same operating parameter. The procedure followed in the invention makes it possible to recognize irregularities in the voltage supply such as voltage breaks, drifts or short-term or long-term shunts to ground or to the vehicle electrical system.

Special significance is imparted to this fact wherein ganged potentiometers are provided for measuring the position of a power-determining element of an internal combustion engine or of a motor vehicle such as of an operating element actuable by the driver or of a power actuator, such as in an electronic engine power control system, since there the occurring effects of irregularities in the voltage supply can have consequences critical to safety. The procedure afforded by the invention contributes to an improvement of the operational reliability of such systems.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
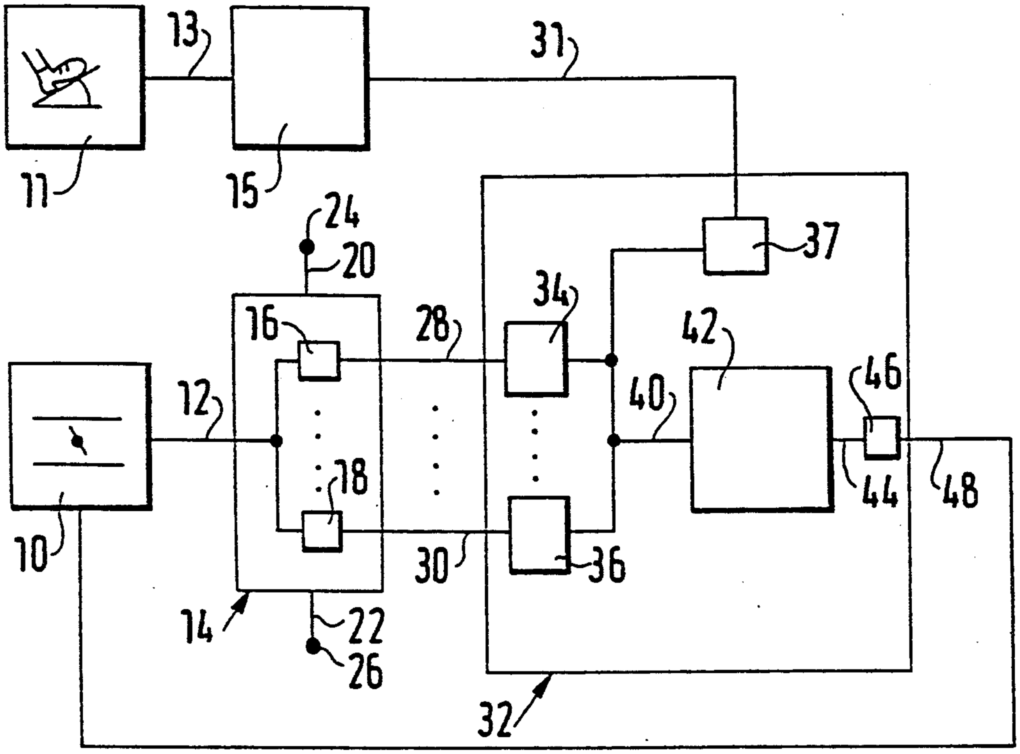
FIG. 1 is a block diagram showing the incorporation of the measuring devices in an engine control such as an electronic engine power control.

The embodiment described below relates to an arrangement for detecting the position of a power-determining element of an internal combustion engine or of a motor vehicle especially in combination with an electronic engine power control system. In FIG. 1, reference numeral 10 identifies a power-determining element of an internal combustion engine and/or of a motor vehicle. This power-determining element can preferably be a power actuator such as a throttle flap or control rod. The power-determining element 10 is connected to a detecting arrangement 14 via a transmitting path 12 so that the position of the power-determining element can be detected. The arrangement 14 includes at least two position measuring devices (16 and 18) which are referred to in the following as sensors. Each of these sensors (16 and 18) is mechanically coupled to the transmission path 12. In addition, the arrangement 14 or, more particularly, each of the sensors (16 and 18) is connected via connecting lines (20 and 22), respectively, to a positive pole 24 as well as to a negative pole 26 of the supply voltage.

In an analog manner, an arrangement of this kind is also provided for an operating element actuable by the driver such as an accelerator pedal for detecting the position thereof. The arrangement 15 for detecting position assigned to the accelerator pedal 11 via transmitting path 13 is not shown in greater detail for the purpose of clarity. The configuration of the arrangement 15 is however clear from the arrangement 14. The following explanations with reference to arrangement 14 therefore are likewise applicable to the arrangement 15.

The signal values for the position of the power-determining element 10 are transmitted to the open-loop/closed-loop control system 32 via respective connecting lines 28 and 30. These signal values are formed in dependence upon the position of the power-determining element 10 in accordance with the characteristic of the corresponding sensor. The connecting lines 28 and 30 connect the respective sensors 16 and 18 to the control system 32. The connecting lines 28 and 30 lead to respective input circuits 34 and 36 in the control system 32. These input circuits 34 and 36 comprise at least analog-to-digital converters for generating digital position values. The digital values are supplied to a computer element 42 via the lines 40 which, for example, can be built up in the form of a data bus. The open-loop and/or closed-loop control function of the electronic engine power control system and the function check of the arrangement 14 described below are carried out in the computer element 42. The computer element 42 is connected to the power-determining element 10 via a line 44, an output stage 46 as well as a drive line 48.

In a like manner, the arrangement 15 assigned to the accelerator pedal leads to the input circuits 37 of the open-loop/closed-loop control system 32 via lines 31 which correspond in number to the number of sensors of the arrangement 15. The outputs of the input circuits 37 form the above-mentioned lines 40.

The signal values generated by the individual sensors represent the position of the elements corresponding thereto. The signal values from arrangement 14 are supplied to the control system for further processing via lines 28 to 30 whereas signal values are supplied to the control system from arrangement 15 via lines 31. For controlling the engine power, the control system carries out a position control of the power actuator on the basis of the position values of the power-determining elements 10 and 11. The desired value pregiven by element 11 is compared to the actual value taken off the element 10 and the power actuator is driven via the line 48 to reduce the difference between the desired and actual values. This closed-loop control can be carried out on the basis of an individual sensor signal value as well as on the basis of a mean value formed from several sensor signal values or from a minimum value of the signal values generated by the sensors. In one embodiment, at least one of the sensor signal values operates to monitor the function of the other sensors with the evaluation of the signal values being carried out especially in the computing unit 42 for monitoring purposes in the control system.

In a known manner, other operating parameters from corresponding measuring devices not shown in FIG. 1 are supplied to the computing element 42 which are processed for open-loop and closed-loop control purposes. The control system 32 includes additional inputs and outputs which are necessary for carrying out functions of engine power control, idle engine speed control, fuel metering, ignition time point determination and the like and are not shown in FIG. 1 for the purpose of clarity.

The arrangement 14 is described above in the context of an electronic engine power control. However, the arrangement 14 can be applied in connection with other control tasks carried out in the area of internal combustion engines and motor vehicles for determining a position or condition such as when measuring the inflowing air quantity or the position determination of the seats of the passengers of the motor vehicle for changing the positions thereof.

Figure 2:
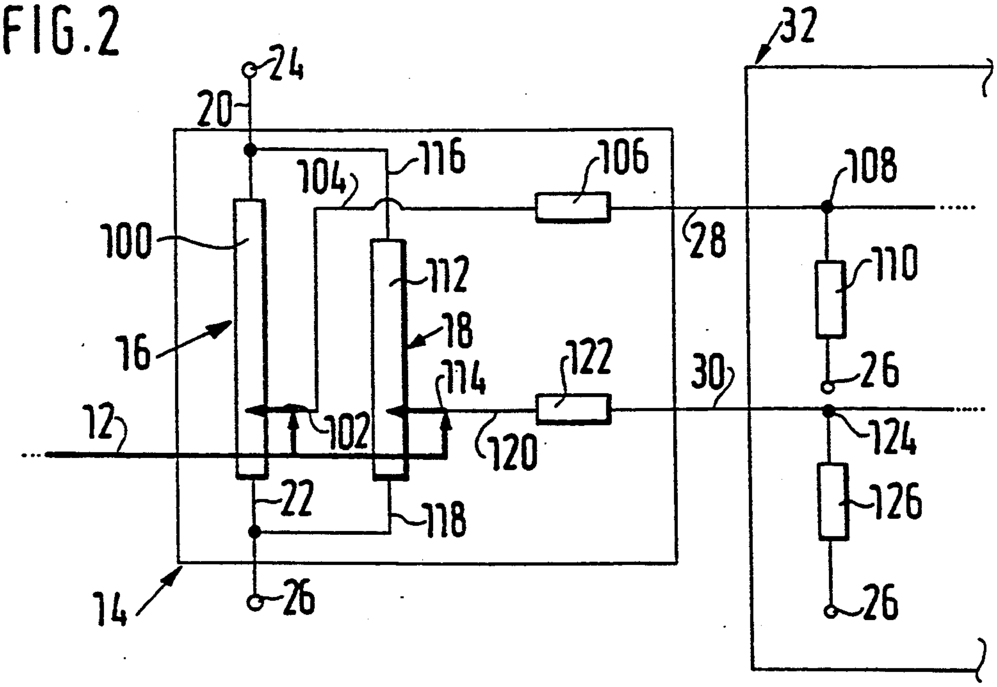
FIG. 2 is a first embodiment of an arrangement of the invention for detecting an operating parameter such as a position with the arrangement being shown incorporating ganged potentiometers which have a characteristic as shown in FIG. 4.
Figure 3:
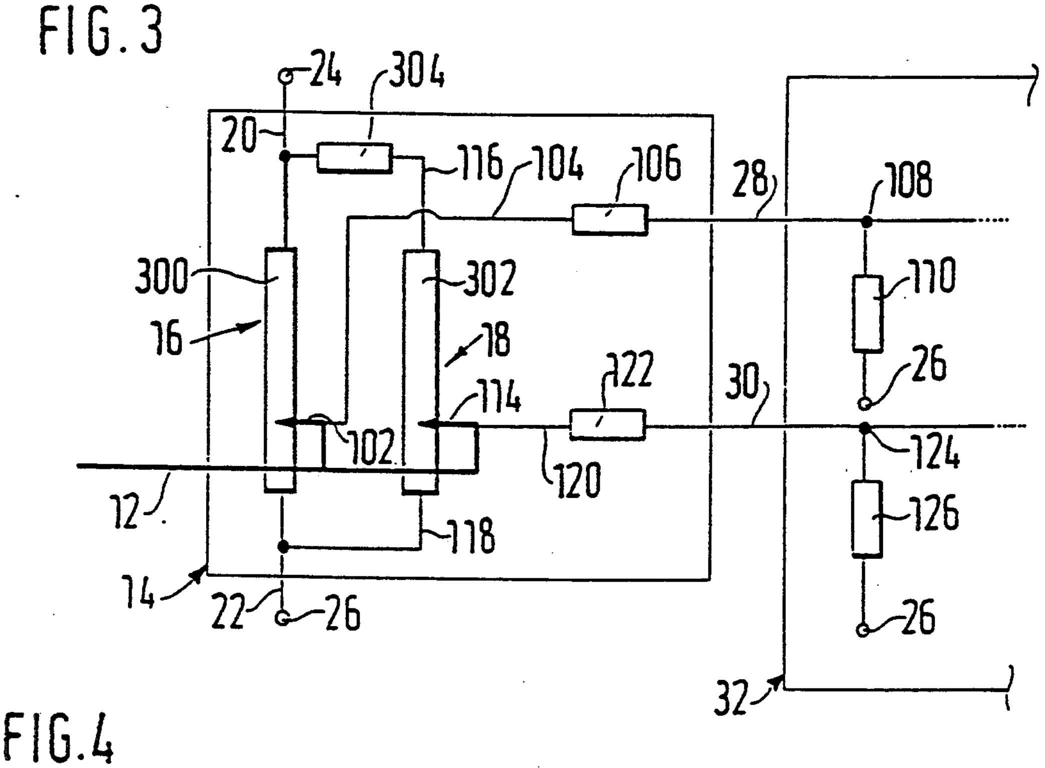
FIG. 3 is another embodiment of an arrangement of the kind shown in FIG. 2.

To eliminate the disadvantages of the arrangement 14 mentioned initially above, two embodiments of the arrangement are shown in FIGS. 2 and 3 in the context of a double potentiometer. The individual potentiometers have characteristics shown in FIG. 4 which deviate from each other and thereby make possible the detection of irregularities in the voltage supply. The arrangement 14 or 15 shown in FIG. 1 includes essentially two sensors 16 and 18 as shown in FIG. 2. The sensor 16 includes a resistance track 100 and a slider 102 with the slider being fixedly connected to the transmitting path 12. In addition, the resistance track 100 is connected via the connecting line 20 to the positive pole 24 and via the connecting line 22 to the negative pole 26 of the supply voltage. The slider 102 of the sensor 16 is connected to a line 104 which leads to a resistor 106. The second connection of the resistor 106 is connected to the connecting line 28 which connects the arrangement 14 with the open-loop/closed-loop control system 32. There, a resistor 110 is connected at circuit node 108 to the connecting line 28. The resistor 110 is connected also to the pole 26 of the supply voltage. The line 28 leads via the circuit node 108 to the input circuit 34 not shown in FIG. 2.

In a like manner, the second sensor 18 includes a resistance track 112 as well as a slider 114 connected to the transmitting path 12. The resistance track 112 is connected via line 116 to the line 20 which is connected to the positive pole 24 of the supply voltage. The second end of the resistance track 112 is connected via line 118 to the line 22 of the negative pole 26 of the supply voltage. Also, the slider 114 is connected via the line 120 and the resistor 122 to the line 30. The line 30 is connected via circuit node 124 to the input circuit 36 shown in FIG. 1. A resistor 126 is connected between the circuit node 124 and the pole 26 of the voltage supply.

The two sliders 102 and 114 of the sensors 16 and 18, respectively, are connected in the same manner with the transmitting path 12 and move in the same direction across the resistance tracks 100 and 112, respectively, in dependence upon the position of the power-determining element 10 of the motor vehicle with the position being transmitted to the sliders via the transmitting path 12. Because of the rigid coupling of the sliders to the transmitting path 12 and thus to one another, the position of the two sliders is not displaceable relative to each other. Signal values are taken off the sliders via the lines 104 and 120, respectively, and the signal values represent the particular position of the power-determining element 10. One of these signal values is converted into voltage values for further processing in the computer element 42 via the resistors 106 and 110 while another signal value is converted into a voltage value via resistors 112 and 126 also for further processing in the computer element 42.

The relationship of the signal values taken from the sliders 102 and 114 and the position of the power-determining element 10 is linear at least outside of the extreme value range with the position of the element 10 being transmitted via the transmitting path 12. One of the signal values results directly from the position of the slider 102 on the resistance track 100 because of the voltage divider defined by the slider 102 on resistance track 100. The second signal value results directly from the position of the slider 114 because of the voltage divider formed by the slider 114 and the resistance track 112. Because of the differently selected lengths of the resistance paths 100 and 112, slopes of the characteristics of the sensors 16 and 18 deviate from each other because of the positions of the sliders 102 and 114 having respectively different divider ratios. The slope of the characteristic with the longer resistance track is generally less than the slope of the sensor having the shorter resistance track. This relationship is shown in FIG. 4.

Figure 4:
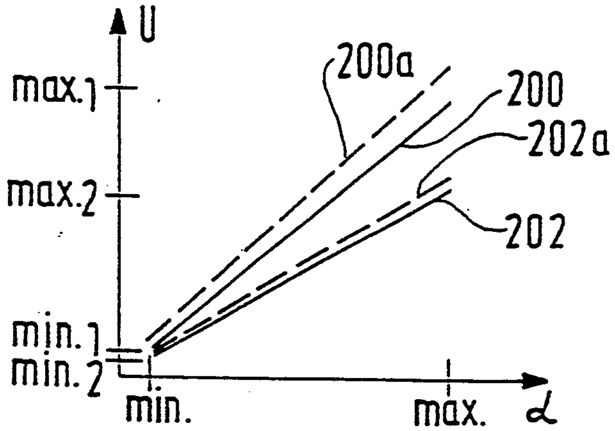
FIG. 4 shows a characteristic of the embodiment shown in FIG. 2.

In FIG. 4, the horizontal axis defines the operating parameter of the engine or vehicle to be measured, namely the position of a power-determining element, which parameter can be varied in its range of values between a minimum (min) and a maximum (max) value which, for example, can correspond to respective stops of the power-determining element. The signal values taken from the sliders 102 and 114 are indicated on the horizontal axis. These signal values move within a signal range between a minimum signal value ($min_1$, $min_2$) corresponding to the minimum value of the operating parameter and a maximum signal value ($max_1$, $max_2$) corresponding to the maximum value of the operating parameter.

This assignment is in dependence upon the voltage drop across the particular resistance track and thereby directly dependent upon the supply voltage. Changes in the supply voltage therefore lead to a change in the association described above.

The resistance tracks shown in FIG. 2 are of different length and lead to different signal ranges of the sensor signal values corresponding thereto. In FIG. 4, the characteristic 200 assigned to the sensor 18 and the characteristic 202 assigned to the sensor 16 are shown. Sensor 16 is equipped with the resistance track 100 which is longer than the resistance track 112. Both characteristics have slopes different from each other. The value range of the signal value of the sensor 16 is changed compared to that of the sensor 18; in the case of FIG. 4, the signal value of the sensor 16 is reduced compared to that of sensor 18.

Since the association of position to signal value is dependent upon the voltage drop across the particular resistance track and therefore directly dependent on the supply voltage, changes in the supply voltage lead to changes in the characteristics shown in FIG. 4. This fact is utilized for error evaluation of irregularities in the supply voltage range in accordance with the procedure explained with respect to FIGS. 5 and 6.

The circuit measures shown in the arrangement of FIG. 3 afford another possibility of generating the characteristics shown in FIG. 4. The elements which have already been presented and described with respect to FIG. 2 have the same reference numerals in FIG. 3 and are not further mentioned. The resistance tracks 300 and 302 of sensors 16 and 18, respectively, shown in FIG. 3 have the same length which is in contrast to the resistance tracks of FIG. 2. For generating the performance according to FIG. 4, an element having resistance such as a resistor 304 is inserted into the supply voltage line 116 of the resistance track 302 of the sensor 18. In the same manner as an increase in the length of a resistance track as shown in FIG. 2, this measure leads to the condition that for each position of the slider, the voltage drop forming the signal value between the slider and the negative pole (or the voltage drop from the positive pole of the supply voltage to the slider) is different in amount; that is, for the resistance track provided with the resistance element 304, the voltage drop is smaller than for the other resistance tracks. The characteristic performance according to FIG. 4 is obtained in this manner. In this connection, attention is called to the fact that, in FIG. 3, the characteristic assigned to the sensor 18 has a form corresponding to characteristic 202 in FIG. 4; whereas, the characteristic associated with sensor 16 has the form of the characteristic 200.

The measures taken in the embodiments of FIGS. 2 and 3 were undertaken for each embodiment in the area of the positive connection of the sensors. The same effect would be obtained without affecting the basic idea of the invention by applying the same measures in the area of the negative pole.

In addition, it is noted that in the embodiments described above, the position control of the power actuator takes place in dependence upon the sensor to which the characteristic 200 is associated with the position control being carried out by the control system. The second sensor having the characteristic of lesser slope serves to monitor the function of the first sensor.

Irregularities in the supply voltage of the sensors and especially such irregularities which cause a change of the signal range of the sensor signal values can take place and lead to a displacement of the characteristics 200 and 202 as it is shown in phantom outline in FIG. 4 for a quantity increase of the signal range with respect to characteristics 200*a* and 202*a*.

Figure 5:
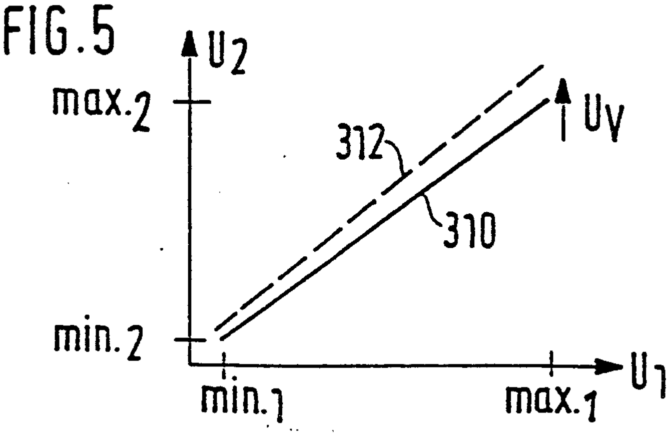
FIG. 5 is a graph showing the linear relationship between the outputs of the two sensors of the circuit arrangement of FIG. 1; and, FIG. 6 shows a flowchart which in combination with the characteristic diagram of FIG. 5 provides a possible embodiment for detecting irregularities in the voltage supply range of the detecting arrangement.

The signal values of the two sensors are related by a fixed linear relationship which is shown in FIG. 5, for example, by the solid line 310. The signal value of the first sensor is shown on the horizontal axis of FIG. 5 while the signal value of the second sensor is shown on the vertical axis.

A change of the supply voltage for example because of a voltage break and/or drift occurrence with respect to the normal condition according to characteristic 310 leads to a displacement of the characteristic in the diagram of FIG. 5. An increase of the supply voltage and the displacement of the characteristic 310 is illustrated by the broken line 312 in FIG. 5. With an increase in the supply voltage, a displacement of the characteristic takes place such that the characteristic points having different magnitudes in the diagram of FIG. 5 are displaced upwardly with a tendency toward the right.

Figure 6:
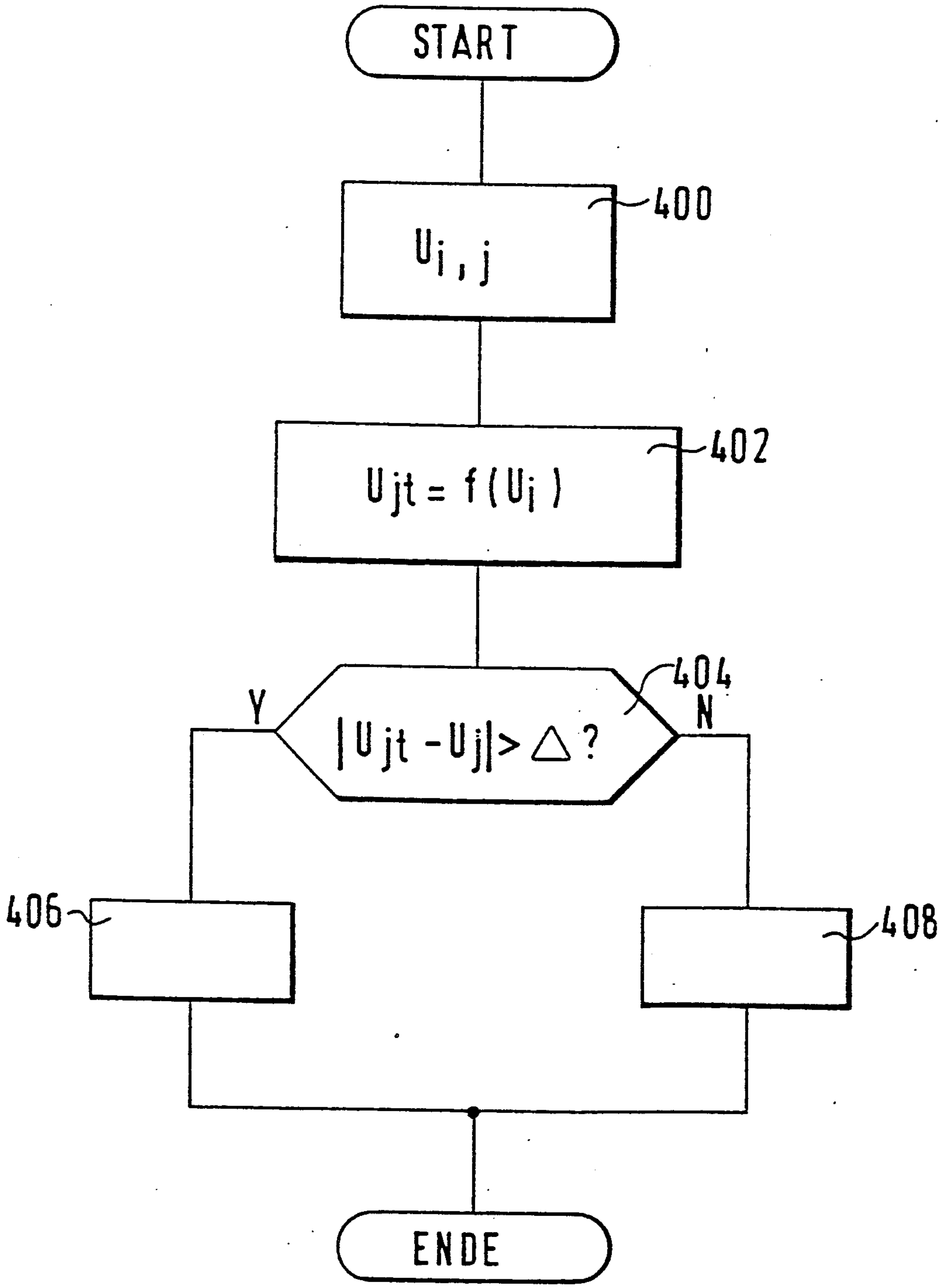

This fact is utilized for the evaluation of the functional capability of the detecting arrangement as shown in the flow diagram of FIG. 6. After start of the program part, the signal values ($U_{i,j}$) of the individual sensors are read in according to step 400. Thereafter, in step 402, the signal value ($U_{jt}$) of one or more sensors is determined in dependence upon the signal value ($U_i$) of the other sensor by means of a pregiven characteristic field 310 according to FIG. 5 representing the normal condition. In the following step 404, this or these theoretical signal values read out from the characteristic field for the normal condition are compared with the actually detected signal values ($U_j$) of the particular sensor and the inquiry is made as to whether theoretical or actual values to each other are within a pregiven tolerance band. For example, this can be undertaken by the formation of the amount of the difference between theoretical and actual value and the inquiry as to whether the difference exceeds a predetermined threshold value. In the last case, the conclusion is reached in step 406 as to whether a malfunction of the sensors takes place because of irregularities in the supply voltage area; whereas, for a negative result of the inquiry in step 404, the sensors are evaluated as being functionally operational. After the step 408 or in the case of a malfunction 406, the program part of FIG. 3 is terminated and, if required, started again.

In the foregoing, an arrangement detecting an operating parameter of an engine and/or vehicle has been described with the arrangement having measuring devices detecting the same operating parameter and the measuring devices, in turn, having a common voltage supply. By means of the procedure of the invention with this arrangement, a check is possible as to the irregularities in the area of this common voltage supply at each operating point during the operating cycle of the engine. The procedure described above is not limited only to the potentiometer arrangement described in the specific embodiments; instead, it is applicable also to other sensor systems for detecting an operating parameter having a common voltage supply especially when considered in the context of the circuit measures shown in FIG. 3.

It is understood that the foregoing description is that of the preferred embodiments of the invention and that various changes and modifications may be made thereto without departing from the spirit and scope of the invention as defined in the appended claims.

What is claimed is:

1. An arrangement for detecting a changing operating parameter of an internal combustion engine of a motor vehicle, the operating parameter having values extending over a range of values which includes an area of extreme values of the parameter, the arrangement comprising:

at least a first and a second measuring device for detecting said operating parameter and for generating first signal values indicative of said operating parameter over the entire range of values of said operating parameter and for generating second signal values likewise indicative of said operating parameter over said entire range of values of said operating parameter;

said first measuring device having a pregiven first characteristic for generating said first signal value and said second measuring device having a pregiven second characteristic for generating said second signal value;

said first and second characteristics each being linear at least for those values in said range lying outside of said area of extreme values; and, said first characteristic has a slope that deviates from the slope of said second characteristic.

2. The arrangement of claim 1, wherein said operating parameter is an angle of a component of the engine such as the angle of a throttle flap or accelerator pedal.

3. The arrangement of claim 1, wherein said operating parameter detected by said measuring devices is the position of a power-determining element of the engine of the vehicle.

4. The arrangement of claim 1, wherein said measuring devices are respective potentiometers.

5. The arrangement of claim 1, wherein the engine includes an electronic engine power control apparatus and said measuring devices are components of said control apparatus.

6. The arrangement of claim 1, further comprising means for altering the range of values of said second signal value thereby forming said second characteristic.

7. The arrangement of claim 1, wherein said second characteristic is formed by a circuit configuration of said second measuring device.

8. The arrangement of claim 7, wherein the arrangement includes a voltage supply and said circuit configuration includes a resistor interposed between said voltage supply and said second measuring device.

9. The arrangement of claim 1, wherein said first and second measuring devices are first and second potentiometers having first and second resistance tracks, said first characteristic being provided by changing the length of said first resistance track.

10. The arrangement of claim 1, further comprising a voltage supply for supplying a voltage to said measuring devices and means for relating said first and second signal values to each other so as to cause fluctuations in said voltage to be detectable.

11. An arrangement for detecting a changing operating parameter of an internal combustion engine of a motor vehicle, the operating parameter having values extending over a range which includes an area of extreme values of the parameter, the arrangement comprising:

at least a first and a second measuring device for detecting said operating parameter and for generating first and second signal values indicative of said operating parameter;

said first measuring device having a pregiven first characteristic for generating said first signal value and said second measuring device having a pregiven second characteristic for generating said second signal value;

said first and second characteristics each being linear at least for those values in said range lying outside of said area of extreme values;

said first characteristic has a slope that deviates from the slope of said second characteristic;

a voltage supply for supplying a voltage to said measuring devices and means for relating said first and second signal values to each other so as to cause fluctuations in said voltage to be detectable; and, a computer unit for determining irregularities in said supply voltage, said computer unit including:

means for detecting said first and second signal values;

means for determining at least one of said signal values on the basis of the other one of said signal values from a characteristic field representing a normal condition;

means for comparing the determined signal value with a detected signal value to a pregiven tolerance band; and, means for determining irregularities in the area of the supply voltage from deviations of said values with respect to said tolerance band.

12. An arrangement for detecting a changing operating parameter of an internal combustion engine of a motor vehicle, the operating parameter having values extending over a range of values which includes an area of extreme values of the parameter, the arrangement comprising:

at least a first and a second measuring device for detecting said operating parameter and for generating first signal values indicative of said operating parameter over the entire range of values of said operating parameter and for generating second signal values likewise indicative of said operating parameter over said entire range of values of said operating parameter;

said first measuring device having a pregiven first characteristic for generating said first signal value and said second measuring device having a pregiven second characteristic for generating said second signal value;

said first and second characteristics each being linear at least for those values in said range lying outside of said area of extreme values;

said first characteristic has a slope that deviates from the slope of said second characteristic;

a voltage supply for supplying a voltage to said measuring devices and means for relating said first and second signal values to each other so as to cause fluctuations in said voltage to be detectable; and, means for evaluating said measured values in dependence upon said characteristics of respectively different slopes to detect the fluctuations in said voltage.

* * * * *